United States Patent
Nakamura

(10) Patent No.: US 8,947,898 B2
(45) Date of Patent: Feb. 3, 2015

(54) POWER CONVERTION CIRCUIT USING HIGH-SPEED CHARACTERISICS OF SWITCHING DEVICES

(71) Applicant: Fuji Electric Co., Ltd., Kawasaki-shi (JP)

(72) Inventor: Shun-ichi Nakamura, Matsumoto (JP)

(73) Assignee: Fuji Electric Co., Ltd., Kawasaki-shi (JP)

( * ) Notice: Subject to any disclaimer, the term of this patent is extended or adjusted under 35 U.S.C. 154(b) by 166 days.

(21) Appl. No.: 13/783,860

(22) Filed: Mar. 4, 2013

(65) Prior Publication Data
US 2013/0176760 A1 Jul. 11, 2013

Related U.S. Application Data

(63) Continuation of application No. 12/662,595, filed on Apr. 26, 2010, now Pat. No. 8,406,024.

(30) Foreign Application Priority Data

Apr. 28, 2009 (JP) ................. 2009-108935

(51) Int. Cl.
*H02M 7/5387* (2007.01)
*H02M 7/538* (2007.01)
(Continued)

(52) U.S. Cl.
CPC .............. *H02M 7/537* (2013.01); *H02M 7/538* (2013.01)
USPC ................ 363/132; 363/131; 363/16; 363/40

(58) Field of Classification Search
USPC ............. 363/16, 40, 55, 56.01, 123, 124, 131
See application file for complete search history.

(56) References Cited

U.S. PATENT DOCUMENTS 4,626,715 A * 12/1986 Ishii ............................... 327/437
5,019,770 A * 5/1991 Harada et al. ................. 323/282
(Continued)

FOREIGN PATENT DOCUMENTS

| JP | S59-063983 A | 4/1984 |
| JP | S62-181680 A | 8/1987 |

(Continued)

OTHER PUBLICATIONS

Japan Patent Office, "Office Action for JP 2009-108935", Feb. 26, 2013.

*Primary Examiner* — Adolf Berhane
*Assistant Examiner* — Henry Lee, III
(74) *Attorney, Agent, or Firm* — Manabu Kanesaka

(57) ABSTRACT

A power conversion circuit converting DC electric power into AC electric power and sending the AC power to an inductive load, includes a first switching device connected to the DC power supply; a second switching device connected to the DC power supply; a first inductor provided between the first switching device and the inductive load; a second inductor provided between the second switching device and the inductive load; and a clamping diode connected between a first connection point between the first switching device and the first inductor, and a second connection point between the second switching device and the second inductor. When the first and second switching devices are turned off, a current flows through the second diode, clamping diode, first inductor and inductive load to completely flow out a current in the first inductor, and then a current flows through the second diode, second inductor and inductive load.

12 Claims, 17 Drawing Sheets

(51) Int. Cl.
  *H02M 7/537* (2006.01)
  *H02M 3/335* (2006.01)
  *H02M 1/12* (2006.01)

(56) References Cited

U.S. PATENT DOCUMENTS

| | | | | |
|---|---|---|---|---|
| 5,107,151 | A | * | 4/1992 | Cambier .......................... 327/432 |
| 5,202,820 | A | * | 4/1993 | Miller et al. ................. 363/56.02 |
| 5,731,967 | A | * | 3/1998 | Gruning ............................ 363/57 |
| 5,801,932 | A | * | 9/1998 | Hwang et al. ............... 363/21.04 |
| 5,907,479 | A | * | 5/1999 | Leu .................................. 363/16 |
| 5,946,208 | A | * | 8/1999 | Yamamoto et al. ............ 363/132 |
| 7,679,944 | B2 | * | 3/2010 | Sakurai ............................ 363/98 |
| 8,406,024 | B2 | * | 3/2013 | Nakamura ...................... 363/131 |
| 2003/0021131 | A1 | * | 1/2003 | Nadot et al. ..................... 363/55 |
| 2003/0058663 | A1 | * | 3/2003 | Bennett ............................ 363/40 |
| 2006/0044856 | A1 | * | 3/2006 | Bird et al. ...................... 363/131 |
| 2008/0043500 | A1 | | 2/2008 | Asano et al. |

FOREIGN PATENT DOCUMENTS

| | | |
|---|---|---|
| JP | 2008-017650 A | 1/2008 |
| JP | 2008-061414 A | 3/2008 |

\* cited by examiner

US 8,947,898 B2

POWER CONVERTION CIRCUIT USING HIGH-SPEED CHARACTERISICS OF SWITCHING DEVICES

CROSS-REFERENCE TO RELATED APPLICATION

This is a continuation application of U.S. patent application Ser. No. 12/662,595 filed on Apr. 26, 2010, which claims a priority of Japanese Patent Application No. 2009-108935 filed on Apr. 28, 2009.

BACKGROUND OF THE INVENTION AND RELATED ART STATEMENT

The present invention relates to a power conversion circuit and more particularly to a power conversion circuit that is capable of more effectively making use of the high-speed characteristics of a switching device compared with a related power conversion circuit using a switching device capable of high-speed switching with the same breakdown voltage and rated current as those of the switching device used in the power conversion circuit according to the invention.

A high breakdown voltage power device fabricated using a silicon carbide semiconductor (hereinafter also referred to as SiC) with a band gap wider than that of silicon (hereinafter referred to as Si) or a group III nitride semiconductor (hereinafter also referred to as GaN, AlGaN, etc.) has a possibility of significantly decreasing on-resistance. With a MISFET (Metal-Insulator-Semiconductor Field Effect Transistor) of breakdown voltage of 1 kV to 1.2 kV class, on-resistance of 5 mΩcm$^2$ or less is obtained. The on-resistance is equal to a half or less compared with the on-resistance of an IGBT (Insulated Gate Bipolar Transistor) of Si of the equal class of breakdown voltage. There is therefore the possibility that future progress in cost reduction and characteristics improvement will lead to substitution of power devices using SiC for most of IGBTs of silicon as a component of an inverter.

The reason for enabling significant decrease in on-resistance by using SiC, AlGaN, etc. is that the dielectric breakdown electric field strength of SiC, AlGaN, etc. is so high that a voltage withstanding layer can be made thin and the amount of doping can be increased to thereby enable the resistance of the voltage withstanding layer to be decreased by two digits or more compared with the resistance of the voltage withstanding layer of Si.

For forming a circuit using such high break down voltage power devices, studies have been carried out using a circuit formed using IGBTs or a circuit formed by using Si MOSFETs (Metal-Oxide-Semiconductor Field Effect Transistors) for small capacities and (relatively) low voltages.

FIG. 10 is a circuit diagram showing a power conversion circuit for a related hard switching system, FIG. 11 is a circuit diagram showing an example of the circuit of a related multi-level converter, FIG. 12 is a circuit diagram showing an example of the circuit for a related voltage resonance type soft switching system, and FIG. 13 is a circuit diagram showing an example of the circuit for a related current resonance type soft switching system.

The power conversion circuit shown in FIG. 10 is a circuit for a so-called hard switching system which previously has been widely fabricated using IGBTs. The power conversion circuit has paired switching devices M1 and M2 provided between the positive and negative poles of a DC power supply V0. In parallel to the switching device M1, a free wheeling diode D1 is provided and, in parallel to the switching device M2, a free wheeling diode D2 is provided. When the switching devices are IGBTs, no current flows in the reverse direction (upward in FIG. 10), which requires external freewheeling diodes D1 and D2. However, when the switching devices are MOSFETs, internally formed body diodes can be used as free wheeling diodes D1 and D2. To an output point NM as the mid-point of the switching devices M1 and M2, an inductive load LL is connected. In FIG. 10, the circuit is illustrated as that only for one phase for simplicity, so that the output side of the load LL is not shown. Actually, however, to the output side of the load LL, when the load LL is that for a single phase circuit, the output point of a power conversion circuit having the same configuration as that shown in FIG. 10 is to be connected and, when the load LL is one in a circuit of multi phases more than three phases, the output points of similar loads, connected to their respective power conversion circuits each having the same configuration as that shown in FIG. 10, are to be connected while being collected together into one.

In general, semiconductor devices, as they are referred to as n-type devices in devices using silicon, are classified into n-type devices and p-type devices according to the conduction type of majority carriers with larger mobility in their semiconductor material, and devices with the same conduction type are used for the switching devices M1 and M2.

In the circuit shown in FIG. 10, n-type devices are used for the switching devices M1 and M2 in each of which the drain is connected to the positive potential side to the potential of the source. Thus, as shown in FIG. 10, the reference potential of a control circuit G2, that controls the switching device M2 connected to the section between the negative pole side of the DC power supply V0 and the output point NM (referred to as a lower arm), becomes the potential of the negative pole side of the DC power supply V0. Compared with this, the reference potential of a control circuit G1, that controls the switching device M1 connected to the section between the positive pole side of the DC power supply V0 and the output point NM (referred to as a lower arm), becomes the potential of the output point NM at a potential on the positive side to the reference potential of the control circuit G2. For controlling the switching speeds of the switching devices M1 and M2, between the switching device M1 and the control circuit G1 and between the switching device M2 and the control circuit G2, gate resistors R1 and R2 are provided, respectively. The resistance value of a gate resistor at turning-on at which a switching device is brought from a conductive state to an interrupted state is generally different from the value at turning-off at which the switching device is brought from an interrupted state to a conductive state. However, for simplicity, the configuration for this purpose is omitted in FIG. 10.

The potential at the output point NM varies from the potential of the negative pole of the DC power supply V0 to the potential of its positive pole. This necessitates control signals given to the control circuits G1 and G2 to be electrically insulated. Thus, in a high voltage power conversion circuit, a signal transmitting device with an insulating property such as a photocoupler is used. Such a device, however, has a possibility of causing a malfunction at an abrupt change in its reference potential. Therefore, in general, a certain limitation is imposed in that the rate of change of the potential at the output point NM with respect to time (hereinafter the rate of change of a current or a voltage with respect to time will be sometimes abbreviated as dV/dt regardless of the current or the voltage) is to be, for example, 10 kV/μs or less.

In a power conversion circuit, there is also a limitation on the rate of change of a current (hereinafter also referred to as dI/dt) flowing in a switching device. Although some kinds of switching devices (IGBTs, etc.) are broken down by excessively high dI/dt that causes local concentration of currents, the limitations on dI/dt are also imposed on circuit configurations. One of them is a limitation on dI/dt due to a voltage surge produced at turning-off. For example, in the case of turning-off the switching device M2, in a closed circuit including the DC power supply V0, the load LL (under the condition of turning-off the switching device M2, the opposite side of the power conversion circuit is equivalently connected to the DC power supply V0) and the switching device M2, there exists stray inductance not shown in FIG. 10. Turning-off of the switching device M2 causes a current flowing in the load LL to flow in the free wheeling diodes D1 and thus cause no particular problem. However, a current flowing through the stray inductance decreases with time to produce an induced electromotive force proportional to the value of the stray inductance and the value of dI/dt. Thus, the voltage due to the electromotive force is superimposed on the voltage at the output point NM to be a voltage surge. A voltage surge causes insulation breakdown on the load side, at worst. Therefore, there is a certain limitation on the value of the voltage surge. From the view point of this, in an ordinary power conversion circuit, care is taken so that the least possible inductance is present.

Incidentally, the so-called multi-level converter exemplified in FIG. 11 might be regarded as an exception. The multi-level converter is used for a purpose of treating a very high power supply voltage. In this case, a number of switching units SUs are paired on the positive pole side and the negative pole side of the DC power supply V0 while being connected in series. Between the series connected switching units SUs on the positive pole side of the DC power supply V0 and the output point NM, an inductor L1 is provided, and between the series connected switching units SUs on the negative pole side of the DC power supply V0 and the output point NM, an inductor L2 is provided. The reason why the multi-level converter unexpectedly has the inductors L1 and L2 connected to the output point NM is that the requirement for each of the switching units is to have a property of allowing a current to flow with an arbitrary amount within the rated amount regardless of a voltage across the unit. No single device is known that meets the requirement and, in many cases, the switching unit SU itself is further formed of a different power conversion circuit. For example, the switching unit SU can include the power conversion circuit according to the invention. Accordingly, a multi-level converter is to be regarded as having an objective different from that of the invention.

Furthermore, a power conversion device is also known which is formed by connecting a switching device and a reactor in a DC current path between the positive pole and the negative pole of a DC power supply (see JP-A-2009-11117, for example). To the reactor, a free wheeling diode is connected in parallel. Also in the power conversion circuit, however, the reactor connected to the switching device is provided for the purpose of detecting an abnormality due to a short circuit between the positive pole and the negative pole of the DC power supply. Thus, a circuit configuration is provided in which a flow of an overcurrent in the reactor due to an abnormality such as a short circuit of the switching device causes a reverse voltage to be applied to the free wheeling diode and the reverse voltage is detected by a controller to be determined as an occurrence of an abnormality to turn-off the switching device. Therefore, the power conversion device disclosed in JP-A-2009-11117 uses the reactor for detecting an overcurrent state of the main current, the objective of which is thus entirely different from that of the invention.

As was described in the foregoing, there are limitations in values of dV/dt and dI/dt. Thus, there is generally an upper limit to the operation speed of a switching device. However, a switching speed that is too low generally prolongs the period within which a current flows in the switching device with a non-zero voltage kept applied to the switching device, due to which a switching loss unfavorably increases. For adjusting the switching speed, adjustment of gate resistance is generally carried out.

Here, an explanation will be made with respect to gate resistance adjustment in the case in which the switching device M2 shown in FIG. 10 is a trench MOSFET of SiC taken as an example for simplicity.

At the turning-off of the switching device M2, the decrease in the output voltage of the control circuit G2 causes the source-gate capacitor of the switching device M2 to discharge through the gate resistor R2, which decreases a source-gate voltage (hereinafter simply referred to as a gate voltage). Then, a current flowing between the source and the drain (hereinafter simply referred to as a drain current) of the switching device M2 is to decrease. The value of the current must be equal to the value of the current flowing in the inductive load LL. Thus, for inhibiting the decrease in current, an induced electromotive force is produced in the load LL and a voltage due to the induced electromotive force is applied as the source-drain voltage (hereinafter simply referred to as the drain voltage) of the switching device M2. A change in the time of the drain voltage (dV/dt) of the switching device M2 causes a displacement current to flow through a gate-drain capacitor with a value proportional to both of the gate-drain capacitance and the change with respect to time in the drain voltage. Since the displacement current causes a voltage drop across the gate resistor R2, no drop occurs in the gate voltage of the switching device M2. In the case of the circuit on the hard switching system shown in FIG. 10, the gate voltage of the switching device is maintained so that at least the current flowing before the turning-off can be maintained. For maintaining the gate voltage, the value of dV/dt is determined. The larger the value of the gate resistor R is or the larger the gate-drain capacitance of the switching device M2 is, the smaller the value of dV/dt for maintaining the same voltage becomes. When the value of the potential at the output point NM becomes higher than the value of the potential on the positive pole side of the DC power supply V0 (more precisely, the value with the on-state voltage of the free wheeling diode added to the value of the potential on the positive pole side), the free wheeling diode D1 is rendered conductive. Thus, the potential at the output point NM is fixed at the potential on the positive pole side of the DC power supply to make the value of dV/dt zero. This causes the gate voltage of the switching device M2 to no longer be maintained in a manner to decrease the gate voltage with a time constant determined by the source-gate capacitance and the resistance of the gate resistor R2. Until the gate voltage decreases to a threshold voltage or less, a drain current continues to flow with its value corresponding to the gate voltage. The larger the resistance of the gate resistor R2 is, the less sharp the cut-off characteristic of the drain current generally becomes.

At the turning-on of the switching device M2, the turning-on starts from a state in which a specified current flows in the load LL. An increase in the gate voltage of the switching device M2 with a time constant determined by the source-gate capacitance and the resistance of the gate resistor R2 increases the drain current according to the increase in the gate voltage. However, until the value of the drain current reaches the specified value of the current flowing in the load LL, a current with the value being equivalent to the difference from the specified value must flow through the free wheeling diode D1. Hence, the potential at the output point NM is kept at the potential at turning-off except the potential due to the induced electromotive force produced with an increase in the drain current by the presence of stray inductance. When the value of the drain current in the switching device M2 reaches the specified current value, the free wheeling diode D1 (for which a diode with significantly small inverse recovery such as a Schottky barrier diode is to be used) is cut off to decrease the drain voltage of the switching device M2. Like at the turning-on, the value of dV/dt is determined so that no gate voltage falls below the gate voltage necessary for maintaining the drain current.

As was explained in the foregoing, by increasing the value of the resistance of the gate resistor R2 according to the gate-drain capacitance of the switching device M2, the value of dV/dt can be prevented from becoming too large. However, the value of the resistance of the gate resistor R2 affects the sharpness in cutting-off a current after the drain voltage reaches the value at which the switching device M2 is in a cut-off state (the value as a sum of the voltage of the DC power supply and the on-state voltage of the free wheeling diode D1) and the rising of a current before the drain voltage reaches the value at which the switching device M2 is in a cut-off state. Therefore, the value of the resistance is excessively high and causes a current to be cut off with poor sharpness and slow rise, which result in an increase in a switching loss.

Incidentally, as a circuit that can decrease a turn-off loss without unintentionally increasing the value of dV/dt, there is known a power conversion circuit on a voltage resonance type soft switching system such as that shown in FIG. 12. The difference from the hard switching system is that capacitors C1 and C2 are provided in parallel to the switching devices M1 and M2, respectively (when the circuit shown in FIG. 12 is independently used, only one of the capacitors C1 and C2 can be used).

For example, when the switching device M2 is turned-off, unlike a circuit on a hard switching system, it is necessary only that the sum of the value of the drain current of the switching device M2 and the value of a current charging the capacitor C2 becomes identical to the value of the current flowing the load LL. Therefore, when the capacitance of the capacitor C2 is sufficiently large, before the drain voltage of the switching device M2 (equal to the voltage across the capacitor C2) begins to significantly increase, the gate voltage decrease to the threshold voltage or below, by which the drain current becomes zero. At this time, a turn-on loss virtually becomes zero and, along with this, the value of dV/dt becomes the value of a quotient for which the value of the current flowing in the load LL is divided by the value of the capacitance of the capacitor C2 and no dV/dt is produced with a value more than the quotient. Even though the state is not extreme to such an extent, the drain current decreases by an amount of a current charging the capacitor C2 to decrease the turn-off loss. Here, since no value of dV/dt exceeds its allowed value, the turn-off loss is to be decreased without unintentionally increasing the value of dV/dt.

However, in the circuit as is shown in FIG. 12, all of currents due to the discharge of the capacitor C2 (and the capacitor C1) at turning-on flow in one switching device (M2 or M1) to increase a current load imposed on the switching device. Along with this, a switching (turn-on) loss also increases. In particular, the turn-on loss is generally larger than the sum of a turn-on loss when a circuit on a hard switching system is turned-on with the same gate resistor R2 used and energy stored in the capacitor C2 (and the capacitor C1). This is because the value of dV/dt is too small for maintaining a current due to discharge of the capacitor C2 (and the capacitor C1).

Conversely, as a circuit for decreasing a turn-on loss, there is known a power converting circuit on a current resonance type soft switching system. The power conversion circuit, with various problems being ignored, is presented as, in the simplest way, the circuit as shown in FIG. 13, for example. The difference with respect to the circuit on the hard switching system shown in FIG. 10 is that an inductor L0 is provided between the DC power supply V0 and the power conversion circuit on the hard switching system. The inductor L0 does not necessarily need to be provided between the DC power supply V0 and the switching device M1. For example, for decreasing the turn-on loss in the switching device M2, the inductor L0 can be provided somewhere in a closed circuit including no load LL and no free wheeling diode D1. At turning-on, a sufficiently large inductance of the inductor L0 allows the maximum value of an induced electromotive force produced in the inductor L0 to be equal to the voltage of the DC power supply V0 (with other small voltages being ignored), by which the drain voltage of the switching device M2 becomes approximately zero. Thereafter, the current in the switching device M2 increases with a current increasing rate that the voltage of the DC power supply V0 is divided by the inductance of the inductor L0. At this time, a turn-on loss virtually becomes zero. Even though the state is not extreme to such an extent, the voltage due to the induced electromotive force produced in the inductor L0 shares the voltage of the DC power supply V0 together with the drain voltage of the switching device M2. Thus, the drain voltage of the switching device M2 is decreased by the voltage produced in the inductor L0 to decrease the turn-on loss by the amount corresponding to the decrease in the drain voltage.

The circuit as shown in FIG. 13 is equivalent to a hard switching circuit with significantly increased stray inductance. Thus, production of a significantly large surge voltage is unavoidable at turning-off.

Here, for reference, explanations will be made with respect to specific examples of switching losses in the above power conversion circuit on the hard switching system (the power conversion circuit shown in FIG. 10) and the power conversion circuit on the soft switching system (represented by the power conversion circuit shown in FIG. 12).

FIG. 14 is a diagram showing an example of the turn-off loss in a power conversion circuit on a hard switching system, FIG. 15 is a diagram showing an example of the turn-on loss in the power conversion circuit on the hard switching system, FIG. 16 is a diagram showing an example of the turn-off loss in a power conversion circuit on a soft switching system and FIG. 17 is a diagram showing an example of the turn-on loss in the power conversion circuit on the soft switching system.

Here, as an example of each of the switching devices M1 and M2, a SiC trench MOSFET with a rated gate voltage of 42V and a rated current of 75 A is used which is arranged to carry out switching of a DC power supply V0 with a power supply voltage of 600V. Each of FIG. 14 and FIG. 16 shows plots with respect to a gate resistance of a turn-off loss (P_off) represented by a broken line and the maximum dV/dt (the maximum value of dV/dt at switching) represented by a solid line. Each of FIG. 15 and FIG. 17 shows plots with respect to a gate resistance of a turn-on loss (P_on) represented by a broken line and the maximum dV/dt represented by a solid line.

First, with reference to FIG. 14 and FIG. 15, an explanation will be made with respect to the switching loss in power conversion circuits on a hard switching system. The value of dV/dt decreases as the gate resistor is made larger. However, at turning-off, even in the case of letting the gate resistance be 50Ω, it is still impossible to reduce the maximum dV/dt to its allowed value of, for example, 10 kV/μs or less. On the other hand, increased gate resistance increases both of turn-off loss and turn-on loss. For example, when gate resistance is 50Ω, a turn-off loss becomes approximately 2 mJ/pulse and a turn-on loss becomes approximately 4 mJ/pulse, and the sum of them becomes approximately 6 mJ/pulse.

Ordinarily, in the case of using an IGBT with the above rated voltage and current, with the use of a Schottky barrier diode for the free wheeling diode, even with the sum of the turn-off loss and the turn-on loss, the switching loss is 10 mJ/pulse or less to be, for example, on the order of 5 mJ/pulse, though the losses depend on various circuit conditions. A MOSFET has the advantage of being faster in switching speed compared with an IGBT. However, in the power conversion circuit on the hard switching system such as that shown in FIG. 10, the use of a MOSFET is to result in an increase in a switching loss in reverse.

In the following, an explanation will be made concerning the switching loss in a power conversion circuit on a soft switching system. With respect to the case in which a capacitor is provided in parallel to a MOSFET like the power conversion circuit shown in FIG. 12 with the capacitance of the capacitor taken as, for example, 7.5 nF, the results of plots similar to those in the above are shown in FIG. 16 and FIG. 17. From FIG. 16, it is known that, in the case of turning-off, with gate resistance taken as 50Ω, the maximum dV/dt can be decreased to 10 kV/μs or less with the turn-off loss at this time significantly smaller than 1 mJ/pulse. The reason why the maximum dV/dt is high when the gate resistance is low is considered to be an influence of stray inductance in the wiring of the MOSFET (the wiring on the MOSFET side rather than the wiring at the branch of the capacitor C1 or C2).

However, as is understood from FIG. 17, in the case of turning-on, the gate resistance is required to be, for example, 50Ω for decreasing the maximum dV/dt to, for example, 10 kV/μs or less. This results in the switching loss largely exceeding 5 mJ/pulse. With the gate resistance made to be on the order of 30Ω, for example, the turn-on loss might become on the order of 3 to 4 mJ/pulse on the diagram. Further detailed studies, however, show that the turn-on loss sometimes becomes a little lower due to the resonance caused by the presence of the capacitors C1 and C2 and stray inductance (when the gate resistance is 5Ω, for example, the turn-on loss is on the order of 1.2 mJ/pulse, which shows that the energy to be released from the capacitor C2 by turn-on is smaller than 1.35 mJ/pulse). Thus, the turn-on loss is not always become on the order of 3 to 4 mJ/pulse.

That is, when a MOSFET is used for a switching device, even with the use of a power conversion circuit on a voltage resonance type soft switching system, a decrease in switching loss is almost impossible.

[Patent Document 1] JP-A-2009-11117

As was explained in the foregoing, there were problems in that a power conversion circuit on a hard switching system can not decrease the value of the rate of change in voltage to a specified value or less even though gate resistance is adjusted and a power conversion circuit on a voltage resonance type soft switching system can not decrease a switching loss at turning-on of a switching device.

The invention was made in view of such points with an object of providing a power conversion circuit which can decrease the value of a rate of change in voltage without significantly increasing a switching loss when using a switching device that can not effectively decrease the value of a rate of change in voltage by normally increasing gate resistance to cause the rate of change in voltage to become excessively high.

Further object and advantages of the invention will be apparent from the following description of the invention.

SUMMARY OF THE INVENTION

In order to solve the problems in the foregoing, in a first aspect of the invention, a power conversion circuit converting DC electric power of a DC power supply into AC electric power to send the AC power to an inductive load is provided which comprises: a first switching device connected to the positive pole side of the DC power supply to exhibit a conductive state and an interrupted state of a current; a second switching device connected to the negative pole side of the DC power supply to exhibit a conductive state and an interrupted state of the current; a first inductor provided between the first switching device and the inductive load; a second inductor provided between the second switching device and the inductive load; and a clamping diode connected between a first connection point, being the connection point of the first switching device and the first inductor, and a second connection point, being the connection point of the second switching device and the second inductor, so that conduction is provided in the direction from the second connection point to the first connection point.

According to such a power conversion circuit, the clamping diode short-circuiting the first and second inductors causes no large surge voltage to be produced at turning-off. However, at turning-on, due to the presence of the first and second inductors, a main circuit carries out an operation similar to that of a circuit on a so-called current resonance type soft switching system to slowly increase a current flowing in the first or the second switching device that is being made to turn-on. This decreases a rate of change in voltage. Moreover, the first and second inductances, with their values selected to be such ones as to delay the timing of the rising at which a large amount of a main current begins to flow, can decrease a switching loss.

In a second aspect of the invention, the first switching device has a first capacitor connected in parallel thereto and the second switching device has a second capacitor connected in parallel thereto.

With the first and second capacitors thus provided, the power conversion circuit is operated as a circuit of a voltage resonance type soft switching system. Hence, the advantage can be maintained that there is no increase in turn-off loss even though a rate of change in voltage is decreased.

The power conversion circuit with the configuration described in the foregoing is provided with the inductors on the side of the output point and is provided with a clamping diode so that the voltages produced in the inductors at turning-off are clamped, by which, also at turning-on of each of the switching devices, by the inductors and the clamping diode, a large amount of current is inhibited from suddenly flowing in each of the switching devices. Thus, even though the gate resistors are used with relatively high resistance to decrease a rate of change in voltage, an increase in a turn-on loss can be kept to a minimum. Therefore, the power conversion circuit has the advantage of being able to decrease the rate of change in voltage without significantly increasing a switching loss even with the use of such a switching device as to be unable to effectively decrease the rate of change in voltage at switching by a commonly used method of increasing the resistance of a gate resistor to excessively increase the rate of change in voltage.

Moreover, the power conversion circuit has the advantage that the first and second capacitors connected in parallel to the first and second switching devices, respectively, induce no turn-off loss increase even though a rate of change in voltage is decreased by adjusting the resistance value of the gate resistor of each of the switching devices like in a circuit on a voltage resonance type soft switching system.

DETAILED DESCRIPTION OF PREFERRED EMBODIMENTS

In the following, explanations will be made with respect to embodiments of the power conversion circuit according to the invention with reference to attached drawings.

Figure 1:
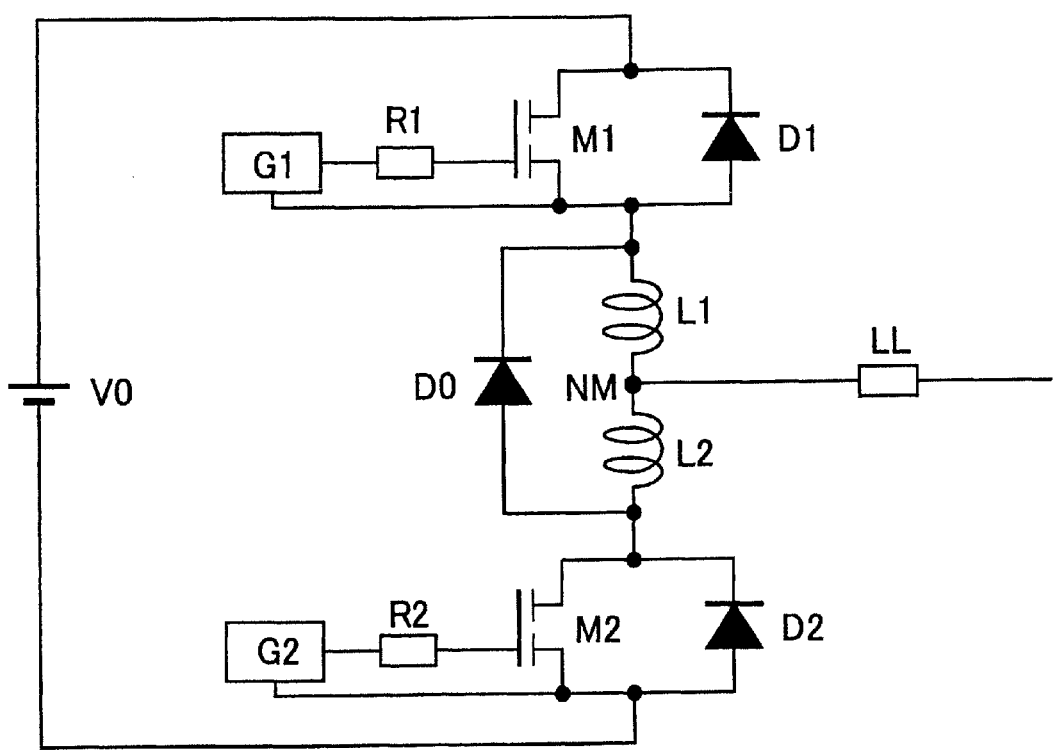
FIG. 1 is a circuit diagram showing a power conversion circuit according to a first embodiment of the invention.

FIG. 1 is a circuit diagram showing a power conversion circuit according to a first embodiment of the invention.

The power conversion circuit has switching devices M1 and M2 connected to the arm on the positive pole side of a DC power supply V0 (referred to as the upper arm) and the arm on the negative pole side (referred to as the lower arm), respectively. In FIG. 1, each of the switching devices M1 and M2 is shown as one n-channel MOSFET. The switching device, however, can be formed of a device group including a plurality of devices. To the switching devices M1 and M2, free wheeling diodes D1 and D2 are connected in parallel, respectively. To the gates of the switching devices M1 and M2, control circuits G1 and G2 are connected through gate resistors R1 and R2, respectively. For the switching devices M1 and M2, devices having the same conduction type are used. Hence, at least one of the control circuits G1 and G2 uses a photocoupler for electrically isolating its reference potential from that of the other. The power conversion circuit is operated by relying on an electrically isolated external signal as, for example, a PWM (Pulse Width Modulation) controlled inverter.

Between the switching device M1 in the upper arm and the switching device M2 in the lower arm, series connected inductors L1 and L2 are inserted. To the switching device M1 side terminal of the inductor L1 and the switching device M2 side terminal of the inductor L2, a clamping diode D0 is connected so that conduction is provided in the direction from the lower arm to the upper arm. The connection point of the inductors L1 and L2 forms an output point NM of the power conversion circuit, to which point a load LL is connected.

With the clamping diode D0 provided in this way, in spite of the presence of the inductors L1 and L2 provided at the output point NM, no surge voltage considerably higher than that in a circuit on a hard switching system is produced at turning-off by the operation as will be explained in the following.

Figure 10:
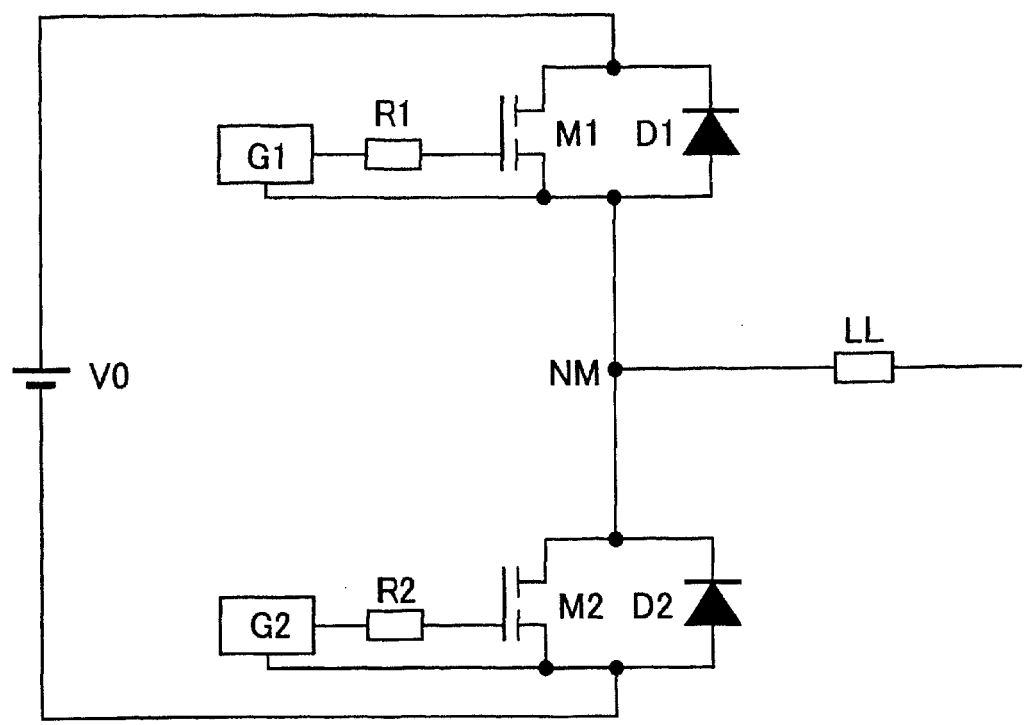
FIG. 10 is a circuit diagram showing a power conversion circuit on a related hard switching system.
Figure 11:
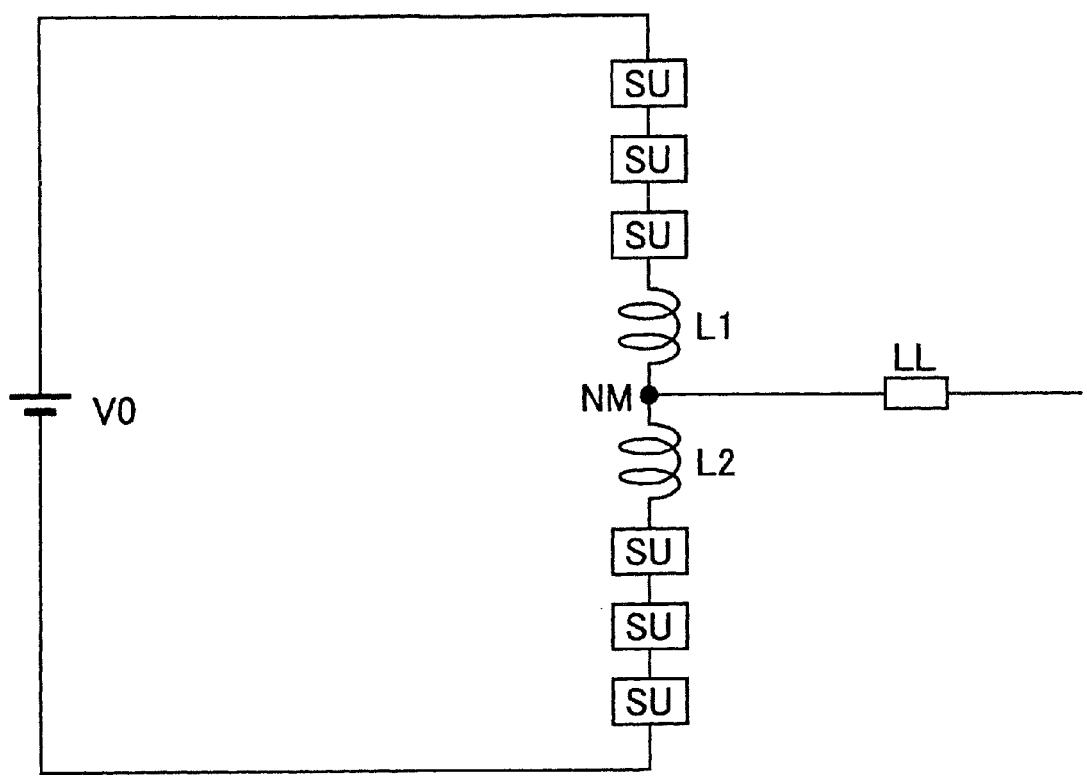
FIG. 11 is a circuit diagram showing an example of the circuit of a related multi-level converter.
Figure 12:
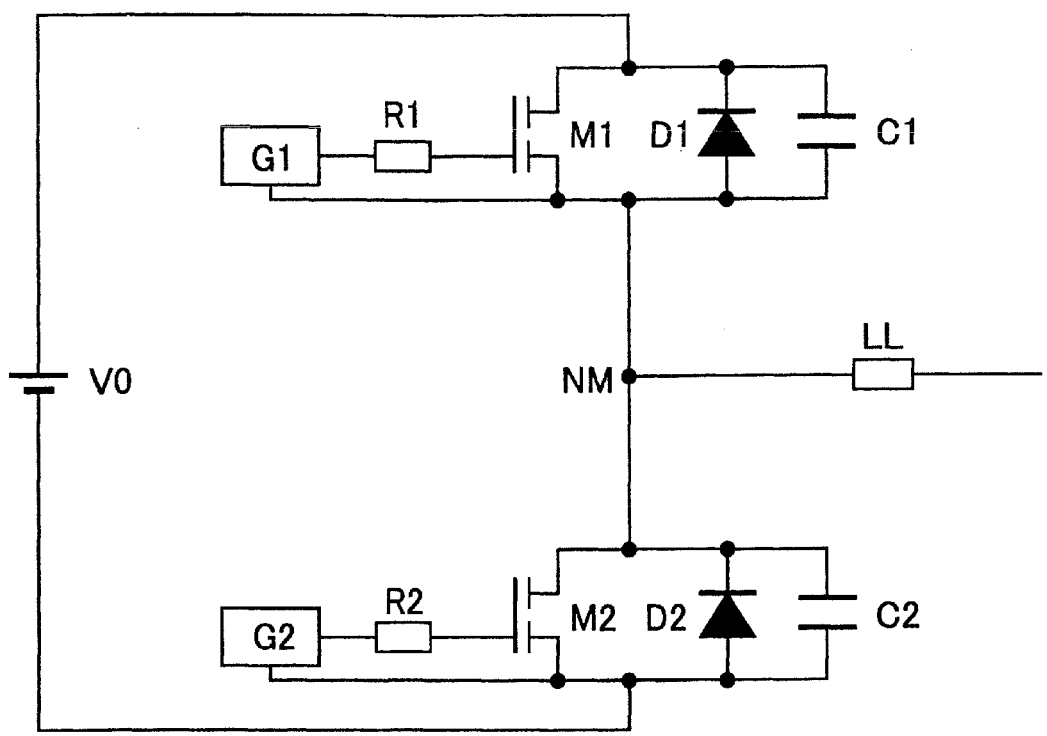
FIG. 12 is a circuit diagram showing an example of the circuit on a related voltage resonance type soft switching system.
Figure 13:
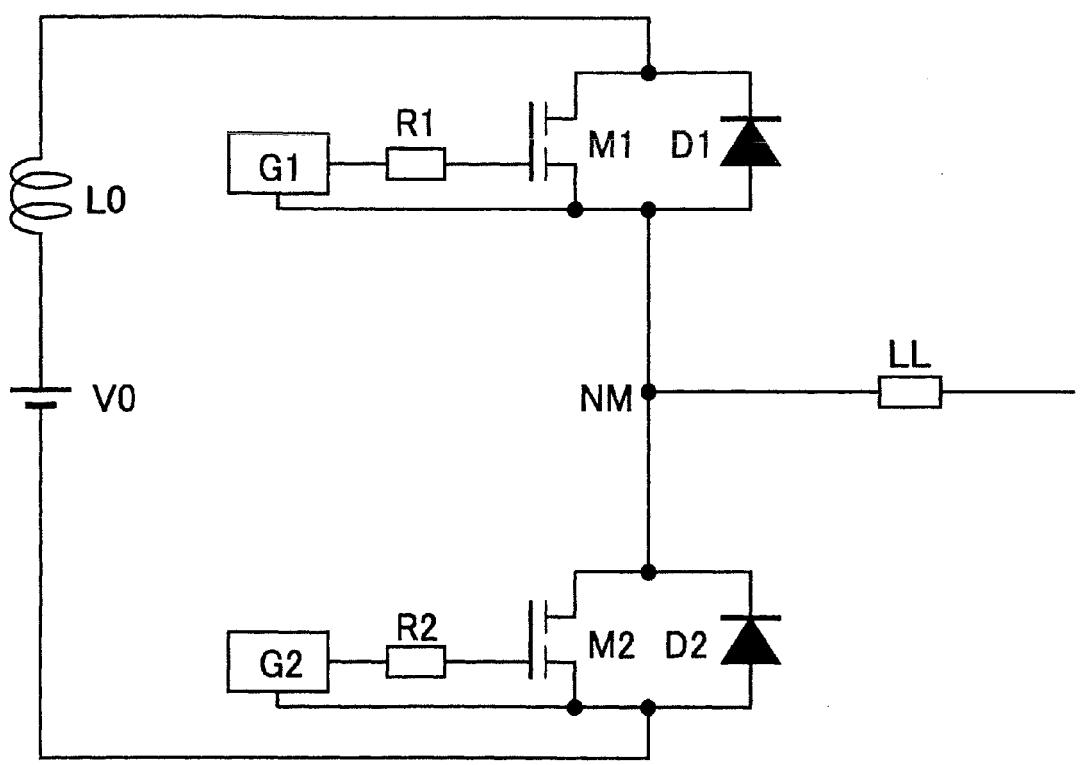
FIG. 13 is a circuit diagram showing an example of the circuit on a related current resonance type soft switching system.
Figure 14:
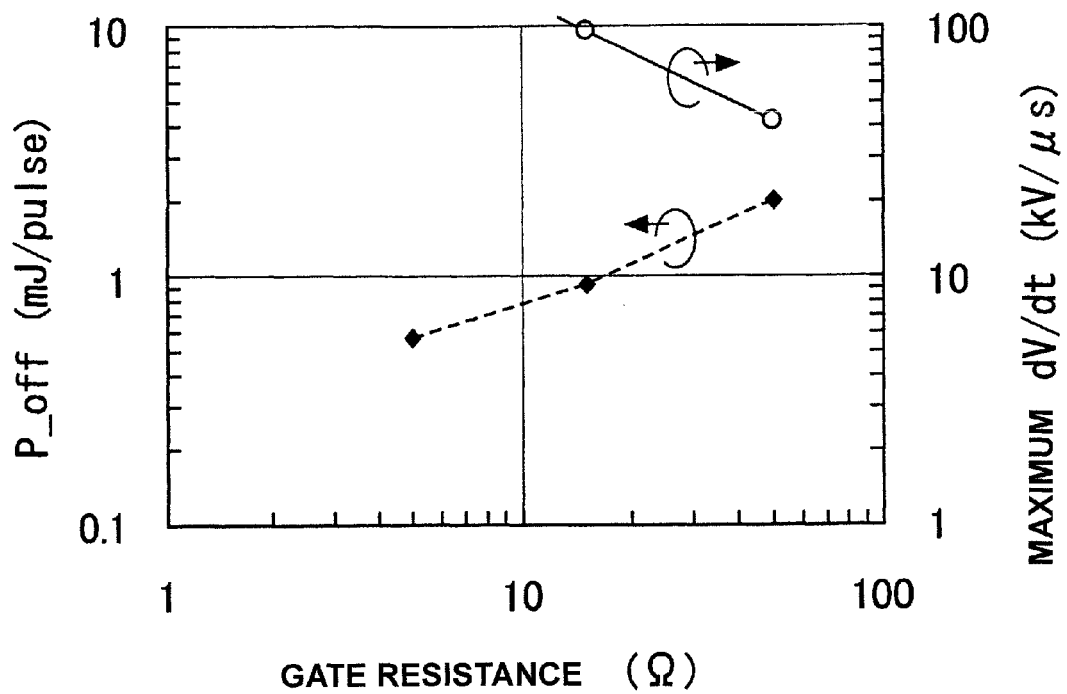
FIG. 14 is a diagram showing an example of the turn-off loss in a power conversion circuit on a hard switching system.
Figure 15:
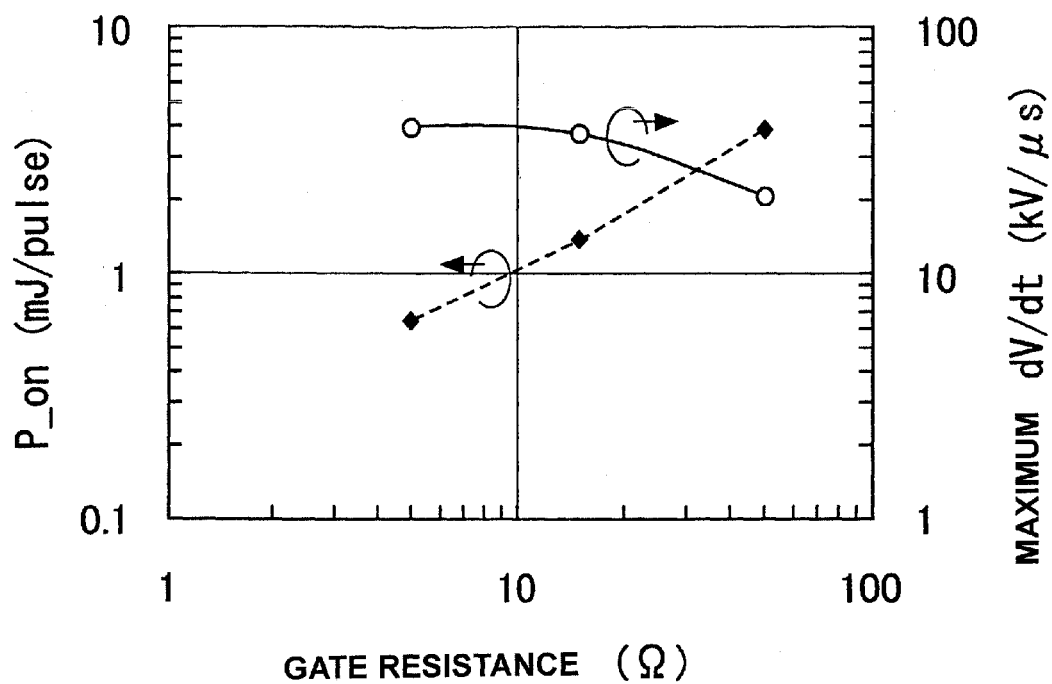
FIG. 15 is a diagram showing an example of the turn-on loss in the power conversion circuit on the hard switching system.

For example, when the switching device M2 is turned-off with a specified load current flowing (downward in FIG. 1) in the inductor L2, a current flowing in the switching device M2 is going to decrease to cause an induced electromotive force to be produced in the inductor L2 (downward in FIG. 1) with the value depending on a rate of change in current dI/dt. When the inductance of the load LL is sufficiently larger compared with the inductance of each of the inductors L1 and L2, a current changing with the rate of change in current dI/dt at this time flows in the inductor L1. Thus, an induced electromotive force is produced also in the inductor (L1 downward in FIG. 1). Therefore, in a closed circuit formed of the inductors L1 and L2 and the clamping diode D0, an electromotive force is produced in the direction of making the clamping diode D0 conduct. Hence, the clamping diode D0 is rendered conductive so that no more electromotive force is produced in the inductors L1 and L2. At this time, with the potential at the connection point of the switching device M2 and the inductor L2 being higher than the potential on the positive pole side of the DC power supply (actually, like a circuit on a hard switching system, until the condition is satisfied, a current is not substantially changed), the free wheeling diode D1 is simultaneously rendered conductive. Thus, the current flowing in the switching device M2 becomes independent of the specified load current and the current thereafter decreases to complete the turning-off of the switching device M2. Production of a voltage surge is due to the presence of stray inductance in the closed circuit formed of the DC power supply V0, the free wheeling diode D1, the clamping diode D0 and the switching device M2. Therefore, even though there is inductance on the output side, which is considerably larger than the stray inductance, there are produced only voltage surges equivalent to those in the circuit on the hard switching system shown in FIG. 10. To the inductance, however, the inductance due to wiring of the clamping diode D0 is of course added, so that care to provide the shortest possible wiring must be taken. The care is the same as the care in the wiring of the switching devices and the free wheeling diodes in the circuit on the hard switching system.

In parallel with the turning-off of the switching device M2, the flow of the current gradually shifts from the inductor L2 to the inductor L1 because the on-state voltage of the clamping diode D0 is kept approximately constant. The speed of the shift di/dt becomes equal to the value of dividing the on-state voltage of the clamping diode D0 by the sum of the inductance of the inductor L1 and the inductance of the inductor L2. The on-state voltage of the clamping diode D0 can be safely high (although a too high on-state voltage is not preferable because the on-state voltage is added to the surge voltage, no on-state voltage is ordinarily so high as to affect the surge voltage). For example, many SiC Schottky barrier diodes are so designed as to have on-state voltage on the order of 1.5 to 2V. For simplicity, letting the inductance of each of the inductors L1 and L2 be 0.35 μH, a current shifts at approximately a constant pace of 2.1 to 2.9 A/μs. Letting a specified load current be 75 A, the shift of the current is estimated to complete within 40 μs at the longest. Therefore, at the next turning-on of the switching device M2, the shift of the current can be completed, though the shift depends on the carrier frequency of a PWM control inverter.

The energy corresponding to that of the current which has been flowing in the inductor L2 till the turning-off of the switching device M2 (one half of the product of the square of the specified load current and the inductance of the inductor L2) is consumed by the clamping diode D0 at the turning-off to become a switching loss. For example, letting the above values be applied to the specified load current and the inductance of the inductor L2, the switching loss becomes, for example, approximately 0.98 mJ/pulse.

Next, when turning-on the switching device M2, no current flows in the inductor L2. Thus, like in the circuit on the so-called current resonance type soft switching system, a current increases slowly. In this case, the current flowing in the load LL is a current gradually shifting from the inductor L1. However, unlike the case of turning-off, there is no voltage drop due to presence of a device such as a diode. Thus, the energy stored in the inductor L1 simply transfers to the inductor L2 to produce no additional loss. Until a large amount of current starts to flow in the inductor L2, there is an allowance of time, so that even though the resistance value of the gate resistor is increased to decrease the value of dV/dt, there is more allowance that can decrease a turn-on loss than that in a circuit on a hard switching system.

The inductors L1 and L2 provided on the load sides of the switching devices M1 and M2, respectively, have their respective inductances being small as 0.35 μH in the above example. Therefore, the inductances can be also actualized by a stray inductance due to circuit wiring without separately adding passive devices.

Figure 2:
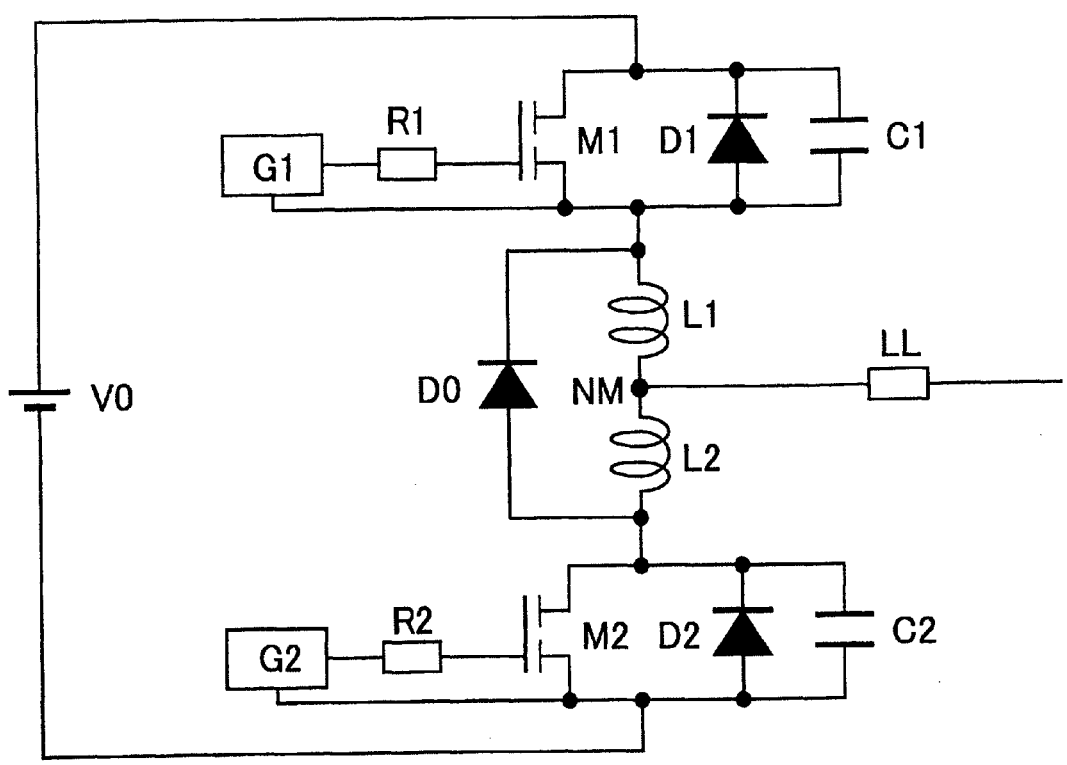
FIG. 2 is a circuit diagram showing a power conversion circuit according to a second embodiment of the invention.
Figure 3:
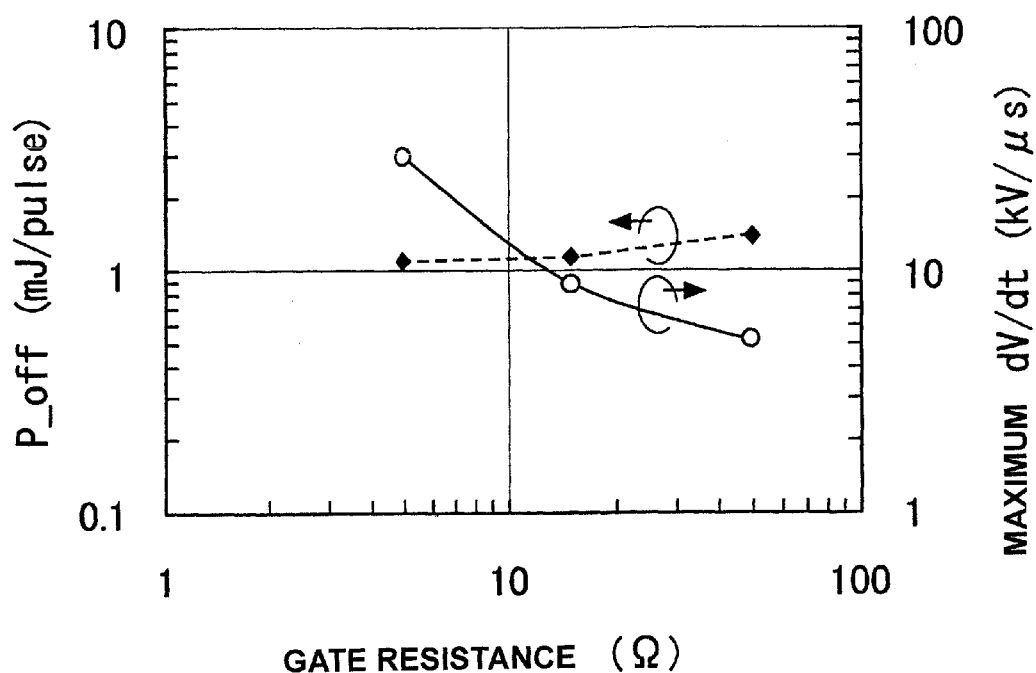
FIG. 3 is a diagram showing an example of the turn-off loss in the power conversion circuit according to the second embodiment of the invention.
Figure 4:
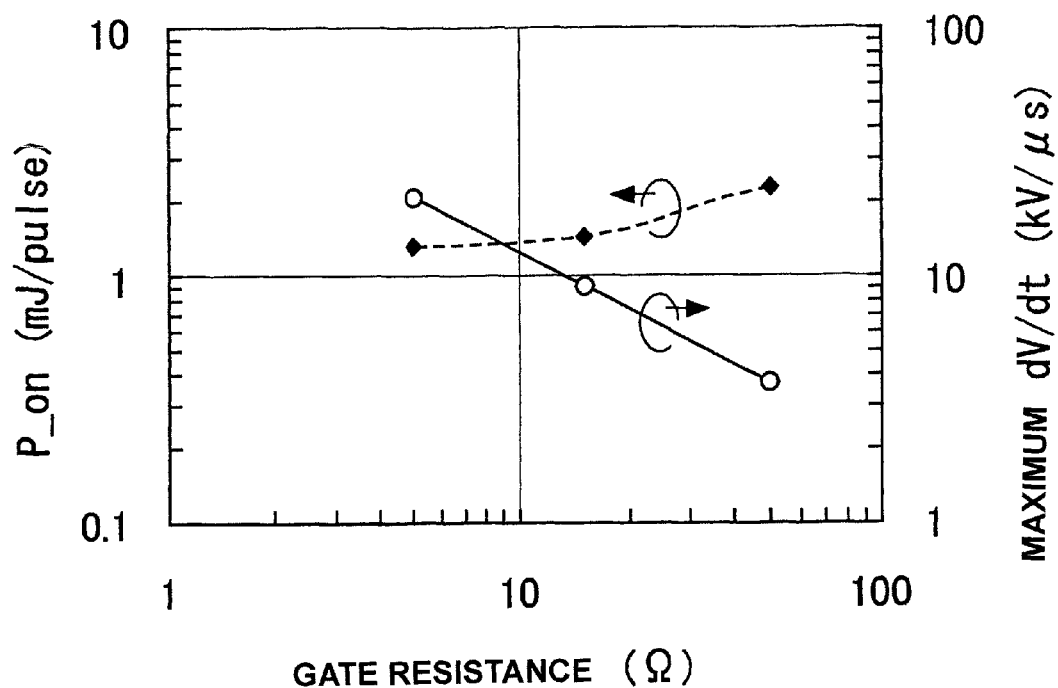
FIG. 4 is a diagram showing an example of the turn-on loss in the power conversion circuit according to the second embodiment of the invention.

FIG. 2 is a circuit diagram showing a power conversion circuit according to a second embodiment of the invention, FIG. 3 is a diagram showing an example of the turn-off loss in the power conversion circuit according to the second embodiment of the invention, and FIG. 4 is a diagram showing an example of the turn-on loss in the power conversion circuit according to the second embodiment of the invention.

The power conversion circuit according to the second embodiment of the invention is a circuit in which the value of dV/dt at turning-off in the power conversion circuit according to the first embodiment of the invention is decreased so that no turn-off loss is increased.

The power conversion circuit has capacitors C1 and C2 connected in parallel to the switching devices M1 and M2, respectively. In this case, unlike an ordinary circuit on a voltage resonance type soft switching system, even though a drain voltage is decreased at turning-on, no load current begins to flow immediately. Therefore, by choosing suitable gate resistors, the value of dV/dt at turning-on can be made decreased without increasing a turn-on loss. For example, consider the case of turning on the switching device M2 with the switching device M2 provided as a MOSFET for simplicity.

When the switching device M2 is to be turned-on, no large current flows immediately in the inductor L2 to cause the capacitor C2 to discharge first. By the current on the whole at this time, the value of dV/dt is determined. When a large amount of current begins to flow in the inductor L2, the discharge of the capacitor C2 progresses and the drain voltage is decreased to some extent to decrease the turn-on loss. Until a large amount of current starts to flow in the inductor L2, there is an allowance of time. Thus, by selecting a gate resistor to have a resistance which is high enough to allow the capacitor C2 to discharge to some extent during the allowance of time, the value of dV/dt at turning-on can be correspondingly decreased.

More specifically, switching loss is shown by an example in which, for example, a MOSFET with a rated gate voltage of 42V and a rated current of 75 A is used for each of the switching devices M1 and M2 to induce switching of a DC power supply V0 with a power supply voltage of 600V. Here, the capacitance of each of the capacitor C1 and C2 was taken as 7.5 nF and the inductance of each of the inductors L1 and L2 was taken as 0.35 μH. Moreover, for the clamping diode D0, an SiC Schottky barrier diode (on-state voltage of approximately 1.5V) was used.

FIG. 3 shows plots with respect to a gate resistance of a turn-off loss (P_off) represented by a broken line and the maximum dV/dt (the maximum value of dV/dt at switching) represented by a solid line. FIG. 4 shows plots with respect to a gate resistance of a turn-on loss (P_on) represented by a broken line and the maximum dV/dt represented by a solid line. From these figures it can be seen that, at both of the turning-off and turning-on, the resistance value of 15Ω, for example, chosen for the gate resistance value can decrease the maximum dV/dt to its allowed value of 10 kV/μs or less. At this time, the turn-off loss is approximately 1.2 mJ/pulse and the turn-off loss is approximately 1.4 mJ/pulse. Thus, the switching loss is on the order of 2.6 mJ/pulse in total. The switching loss is, compared with that in the case of a related circuit using MOSFETs in a class of an equivalent rating, on the order of a half, for example.

Figure 16:
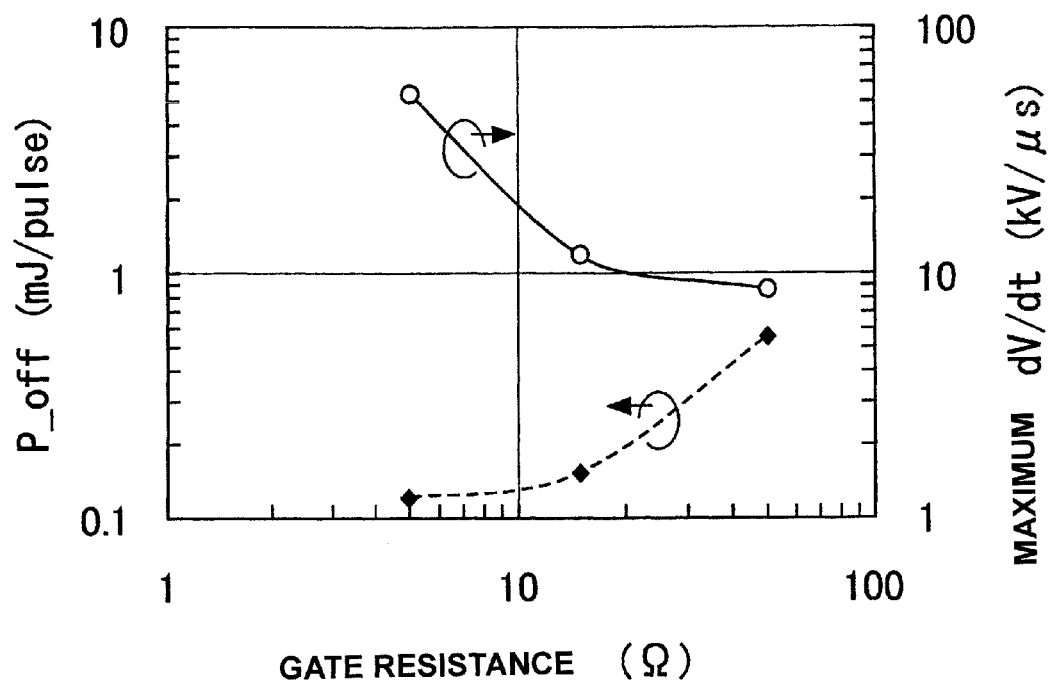
FIG. 16 is a diagram showing an example of the turn-off loss in a power conversion circuit on a soft switching system.
Figure 17:
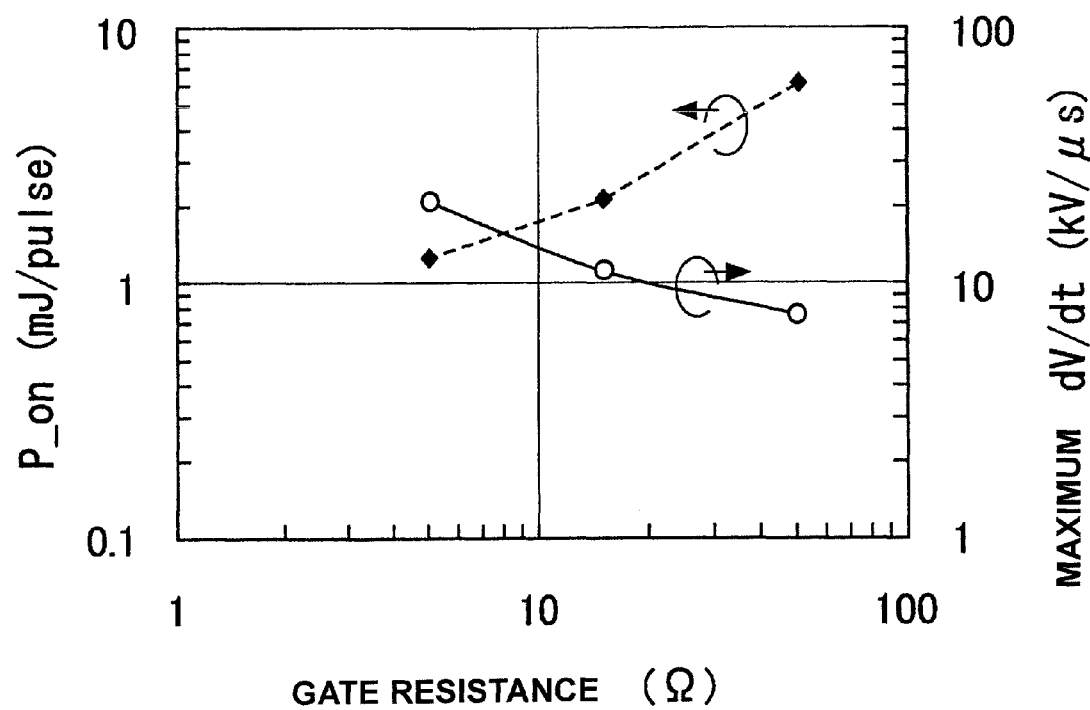
FIG. 17 is a diagram showing an example of the turn-on loss in the power conversion circuit on the soft switching system.

From a more detailed observation of the diagrams, the following can be determined. Namely, in the case of turning-off (FIG. 3), there is no significant difference in the value of dV/dt from that in the case of the related circuit on the voltage resonance type soft switching system (FIG. 16) except that losses due to the presence of the inductors (approximately 0.98 mJ/pulse) are added (in detail, the value of dV/dt decreases slightly). Contrary to this, in the case of turning-on (FIG. 4), the switching loss is significantly decreased compared with the case in the related circuit on the voltage resonance type soft switching system (FIG. 17). This is considered to be due to the presence of inductors L1 and/or L2 inhibiting a large amount of a main current from suddenly flowing in the MOSFET switching elements M1 and M2 at turning-on to provide the capacitors C1 and C2 allowances of time to enable discharging before the main current sufficiently increases. Namely, the inductors L1 and L2 delay the timing of the rising of the main current so that a large amount of the main current begins to flow after the discharging of each of the capacitors C1 and C2 has completed. Therefore, completion of the discharge of the capacitors C1 and C2 contributes to decreased turn-on loss.

As was explained in the foregoing, according to the embodiment, the inductors L1 and L2 are provided on the side of the output point NM and the clamping diode D0 is provided so that the voltages produced in the inductors L1 and L2 at turning-off are clamped. Therefore, at turning-off, like a related circuit on a voltage resonance type soft switching system, the advantage can be maintained which induces no turn-off loss increase even though the value of dV/dt is decreased. At the same time, at turning-on, by the inductors L1 and L2, a large amount of the main current is inhibited from suddenly flowing in the MOSFET switching devices M1 and M2. Thus, even though dV/dt is decreased by using the gate resistors R1 and R2 each with relatively high resistance, an increase in a turn-on loss can be kept to a minimum. Therefore, a circuit configuration is provided which can decrease the value of dV/dt without significantly increasing a switching loss even with the use of such a switching device which is unable to effectively decrease the value of dV/dt at switching by a commonly executed method of increasing the resistance of a gate resistor to excessively increase the value of dV/dt.

Figure 5:
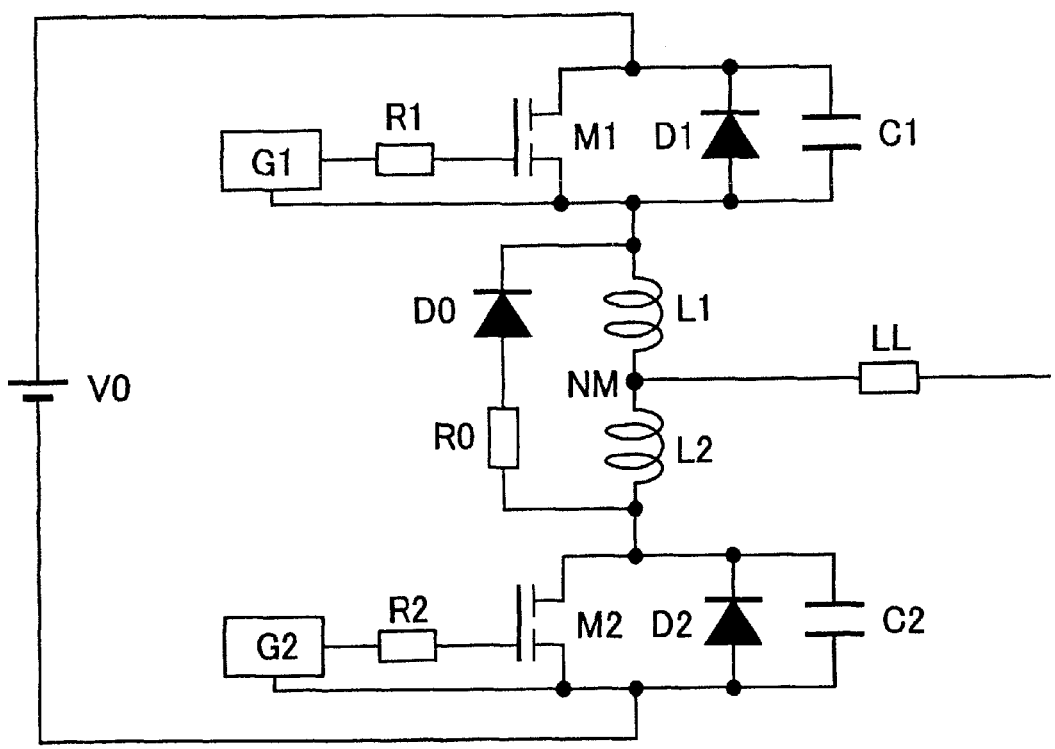
FIG. 5 is a circuit diagram showing a power conversion circuit according to a third embodiment of the invention.

FIG. 5 is a circuit diagram showing a power conversion circuit according to a third embodiment of the invention.

The power conversion circuit has a configuration in which a resistor R0 is inserted in series to the clamping diode D0 in the power conversion circuit according to the second embodiment of the invention to improve its disadvantage of the delay in the shift of a current from the inductor L2 to the inductor L1 at the turning-off of the switching device M2.

Namely, when the inductances of the inductors L1 and L2 are relatively large as compared with a load current, the shift of the current takes some time at turning-off. For example, in the case of the power conversion circuit according to the second embodiment shown in FIG. 2, a little less than 40 µs is required for the shift of the current. With the carrier frequency of the switching becoming higher than on the order of 12 kHz, a turn-on loss (referred to as a loss per one turning-on) was increased. The reason is considered to be that the shift of the current from the inductor L2 to the inductor L1 is insufficient after the turning-off to cause a large amount of current to have flown in the MOSFET switching devices M1 and M2 from the beginning at the subsequent turning-on.

Then, when the resistor R0 of 0.1Ω was inserted in series to the clamping diode D0, even with a carrier frequency of 25 kHz, a remarkable increase in the turn-on loss as in the case of the power conversion circuit according to the second embodiment was not observed. This is considered to be because the shift of the current becomes faster.

Moreover, also in the case in which the clamping diode D0 is provided as two similar diodes connected in series rather than a single diode, no remarkable increase in a turn-on loss was observed with the carrier frequencies up to the order of 25 kHz. However, a high breakdown voltage and high-current diode is generally expensive, so that it is less expensive to insert a resistor for inhibiting a turn-on loss.

As was explained in the foregoing, the insertion of the resistor R0 in series to the clamping diode D0 in the power conversion circuit according to the second embodiment makes the shift of current at turning-off faster in addition to the advantages of the second embodiment. Thus, the third embodiment of the power conversion circuit has the advantage of being effectively operated even though its carrier frequency is high. However, since the voltage produced across the resistor R0 is added to a surge voltage, care must be taken to avoid the use a resistor with excessively high resistance. With a specified load current of 75 A, the resistance of the resistor R0 is up to of the order, at most, of 1Ω from the view point of a surge voltage. However, when the above values are taken as those of the inductances of the inductors L1 and L2, the carrier frequency for the switching and the load current, with the resistance value of the resistor R0 as high as 0.1Ω, the time required for the 99% shift of the current is shortened down to an the order of 16 µs.

Figure 6:
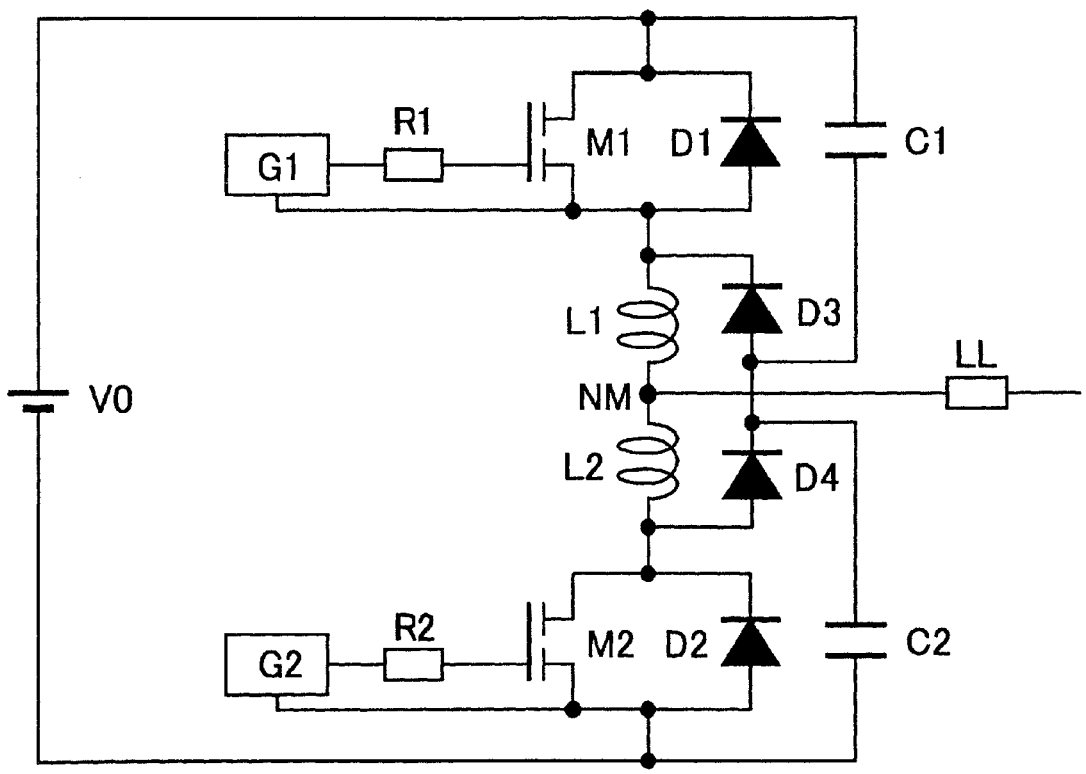
FIG. 6 is a circuit diagram showing a power conversion circuit according to a fourth embodiment of the invention.
Figure 7:
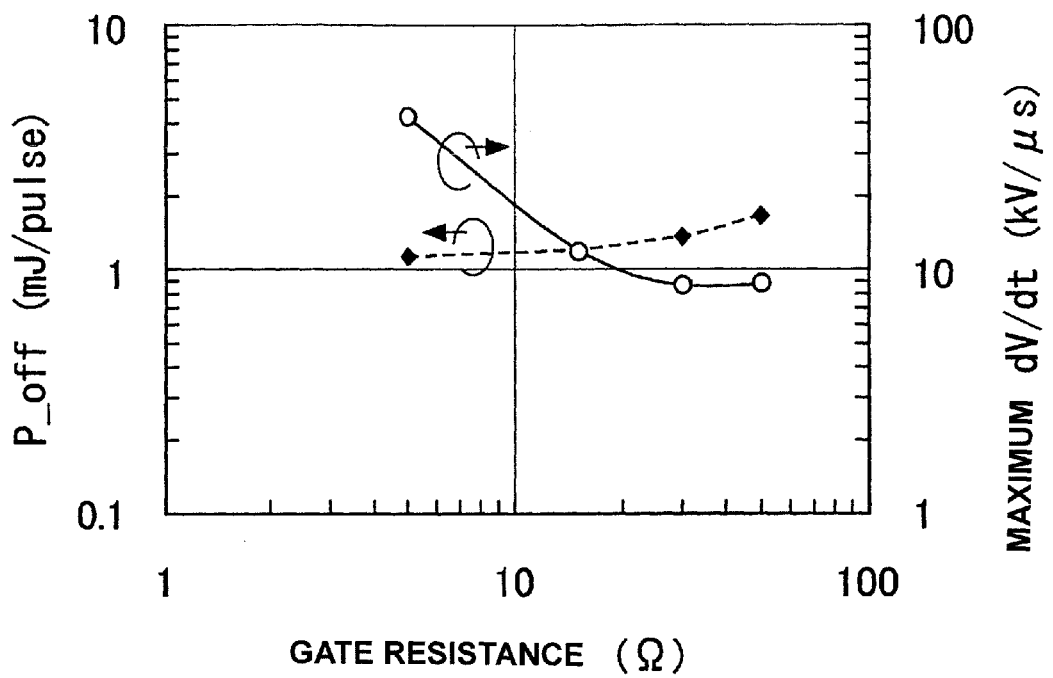
FIG. 7 is a diagram showing an example of the turn-off loss in the power conversion circuit according to the fourth embodiment of the invention.
Figure 8:
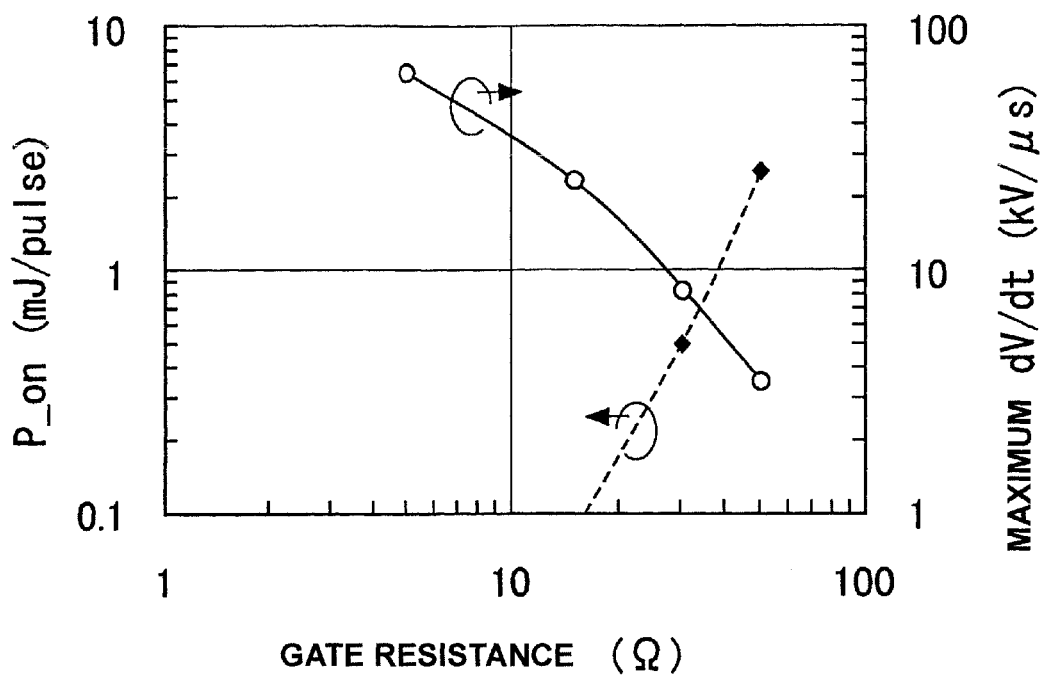
FIG. 8 is a diagram showing an example of the turn-on loss in the power conversion circuit according to the fourth embodiment of the invention.

FIG. 6 is a circuit diagram showing a power conversion circuit according to a fourth embodiment of the invention, FIG. 7 is a diagram showing an example of the turn-off loss in the power conversion circuit according to the fourth embodiment of the invention, and FIG. 8 is a diagram showing an example of the turn-on loss in the power conversion circuit according to the fourth embodiment of the invention.

In the power conversion circuit according to the fourth embodiment of the invention, a configuration is provided in which the clamping diode D0 in each of the power conversion circuits according to the second and third embodiments is formed of two diodes D3 and D4 being connected in series and, to the connection point of the diodes D3 and D4, the capacitors C1 and C2 in the upper arm and the lower arm, respectively, are connected. With only one of the capacitors C1 and C2 being connected in this way, the intended operation is electrically carried out, so that either one of the capacitors C1 and C2 is sufficient, provided that total capacitances must be made equal to those in the case with two capacitors of C1 and C2. However, it is considered that the operation when the power supply voltage fluctuates is more stable in the case where the capacitors C1 and C2 are connected to both of the positive and negative sides, respectively, of the DC power supply rather than the case with only one of them. Therefore, it is preferable to provide the capacitors C1 and C2 in both of the upper arm and the lower arm, respectively.

In the power conversion circuit having the above configuration, at turning-off, either the diode D3, connected to the upper arm with a switching device M1 that is turning-off, or the diode D4, connected to the lower arm with a switching device M2 that is turning-off, is rendered conductive. Hence, the capacitor C1 is virtually brought into a state of being connected in parallel to the switching device M1 that is turning-off or the capacitor C2 is virtually brought into a state of being connected in parallel to the switching device M2 that is turning-off. Therefore, like a circuit on a voltage resonance type soft switching system, the value of dV/dt can be decreased without increasing switching loss.

At turning-on, either the diode D3, connected to the upper arm with the switching device M1 that is turning-on, or the diode D4, connected to the lower arm with the switching device M2 that is turning-on, is rendered conductive. Thus, like a circuit on a current resonance type soft switching system, the current flowing in either the switching device M1 or M2, that is turning-on, increases slowly. Unlike the power conversion circuits according to the second and the third embodiments, the capacitors C1 and C2 are connected to the switching devices M1 and M2 which are turning-on through the inductors L1 and L2, respectively. Thus, the charging and discharging currents of the capacitors C1 and C2 increase slowly like the main current. Therefore, like the main current, the charging and discharging currents of the capacitors C1 and C2 are to increase slowly, so that by appropriately choosing the values of the resistance of the gate resistors R1 and R2, a switching loss can be decreased while decreasing the value of dV/dt.

More specifically, switching loss is shown by an example in which, for example, a MOSFET with a rated gate voltage of 42V and a rated current of 75 A is used for each of the switching devices M1 and M2 to induce switching of a DC power supply V0 with a power supply voltage of 600V. Here, the capacitance of each of the capacitor C1 and C2 was taken as 7.5 nF and the inductance of each of the inductors L1 and L2 was taken as 0.35 μH. Moreover, for each of the free wheeling diodes D1 and D2 and the diodes D3 and D4, an SiC Schottky barrier diode (on-state voltage of approximately 1.5V) was used.

FIG. 7 shows plots with respect to a gate resistance of a turn-off loss (P_off) represented by a broken line and the maximum dV/dt (the maximum value of dV/dt at switching) represented by a solid line. FIG. 8 shows plots with respect to a gate resistance of a turn-on loss (P_on) represented by a broken line and the maximum dV/dt represented by a solid line. From these figures it can be seen that at both of the turning-off and turning-on, the resistance of 30Ω, for example, chosen for the resistance value of each of the gate resistor R1 and R2 can decrease the maximum dV/dt to its allowed value of 10 kV/μs or less. At this time, the turn-off loss is approximately 1.4 mJ/pulse and the turn-on loss is approximately 0.5 mJ/pulse. Thus, the switching loss is on the order of 1.9 mJ/pulse in total. The switching loss, compared with that in the case of the power conversion circuit according to the second embodiment, is smaller by 20% or more.

From the more detailed observation of the diagrams, the following is known. Namely, there is no significant difference in the turn-off loss (FIG. 7) from that in the case of the power conversion circuit according to the second embodiment. However, the turn-on loss (FIG. 8) is considerably decreased to be one-half or less. This is considered that, since the capacitors C1 and C2 are not directly connected in parallel to the MOSFET switching devices M1 and M2, respectively, the charging current or the discharging current of each of the capacitors C1 and C2 are inhibited from suddenly flowing in the MOSFET switching devices M1 and M2, respectively, at turning-on.

As was explained in the foregoing, according to the embodiment, the inductors L1 and L2 are provided on the side of the output point NM and the diodes D3 and D4 are provided so that the voltages produced in the inductors L1 and L2 at turning-off are clamped. Furthermore, the capacitors C1 and C2 are connected to the connection point between the diodes D3 and D4. Therefore, at turning-off, like a related circuit on a voltage resonance type soft switching system, the advantage can be maintained which avoids turn-off loss increase even though the value of dV/dt is decreased. At the same time, at turning-on, by the inductors L1 and L2 and the diodes D3 and D4, a large amount of the main current is inhibited from suddenly flowing in the MOSFET switching devices M1 and M2. Thus, even though the value of dV/dt is decreased by using the gate resistors R1 and R2 each with relatively high resistance, an increase in a turn-on loss can be kept to a minimum. Therefore, a circuit configuration is provided which can decrease the value of dV/dt without significantly increasing a switching loss even with the use of such a switching device as to be unable to effectively decrease the value of dV/dt at switching by a commonly used method of increasing the resistance of a gate resistor to excessively increase the value of dV/dt.

The above circuit configuration can be suitably applied particularly to a power conversion circuit using a MOSFET for a switching device, the base material of which MOSFET is a wide-gap semiconductor with high dielectric breakdown electric field strength. It is because a commonly used method of increasing the resistance of a gate resistor can not effectively decrease the rate of change in voltage at switching of a switching device and strongly tends to cause the rate of change in voltage to be excessively high. In the case of using such a switching device, by applying the device to the power conversion circuit according to the above embodiment, a rate of change in voltage can be decreased without significantly increasing switching loss.

Since the dielectric breakdown electric field strength of a semiconductor such as Sic, AlGaN, etc. is high, when such a voltage as to bring the electric field strength in a semiconductor close to its dielectric breakdown electric field strength is applied to a switching device, the electric field strength in an oxide film of silicon dioxide used for a gate insulator film contacting such a semiconductor becomes excessively high at the turning-off of the switching device. Namely, on both sides of the interface of a semiconductor and an insulator film, electric flux densities, each given as the product of a dielectric constant and electric field strength, must be equal to each other. Therefore, in the case in which the product of the dielectric constant and the dielectric breakdown electric field strength of the semiconductor is larger than the product of the dielectric constant and the normal maximum electric field strength of a gate insulator film, the electric field strength in the semiconductor is so high as to bring the semiconductor to avalanche breakdown and causes the electric field strength in the gate oxide film to become higher than its normal maximum electric field strength when no protection is provided for the gate insulator film. Specifically, since SIC has a dielectric constant of the order of 10 and dielectric breakdown electric field strength of the order of 1.5 to 2.5 MV/cm, the product of the dielectric constant and the dielectric breakdown electric field strength is on the order of 15 to 25 MV/cm. A semiconductor such as AlGaN, etc. is regarded as having a dielectric constant equivalent to that of SiC and dielectric breakdown electric field strength further higher than that of SiC. Compared with this, silicon dioxide, which is often used for a gate insulator film, only has a dielectric constant of a little less than 4 and a normal maximum electric field strength of at most 3 MV/cm to provide the product of the dielectric constant and the normal maximum electric field strength of only 12 MV/cm.

Thus, the gate insulator film must be protected in some form. Here, an example will be shown in which the switching device is a trench gate MOSFET with a structure of protecting a gate insulator film so that the electric field strength in the gate insulator film at the bottom of the trench does not become excessively high.

Figure 9:
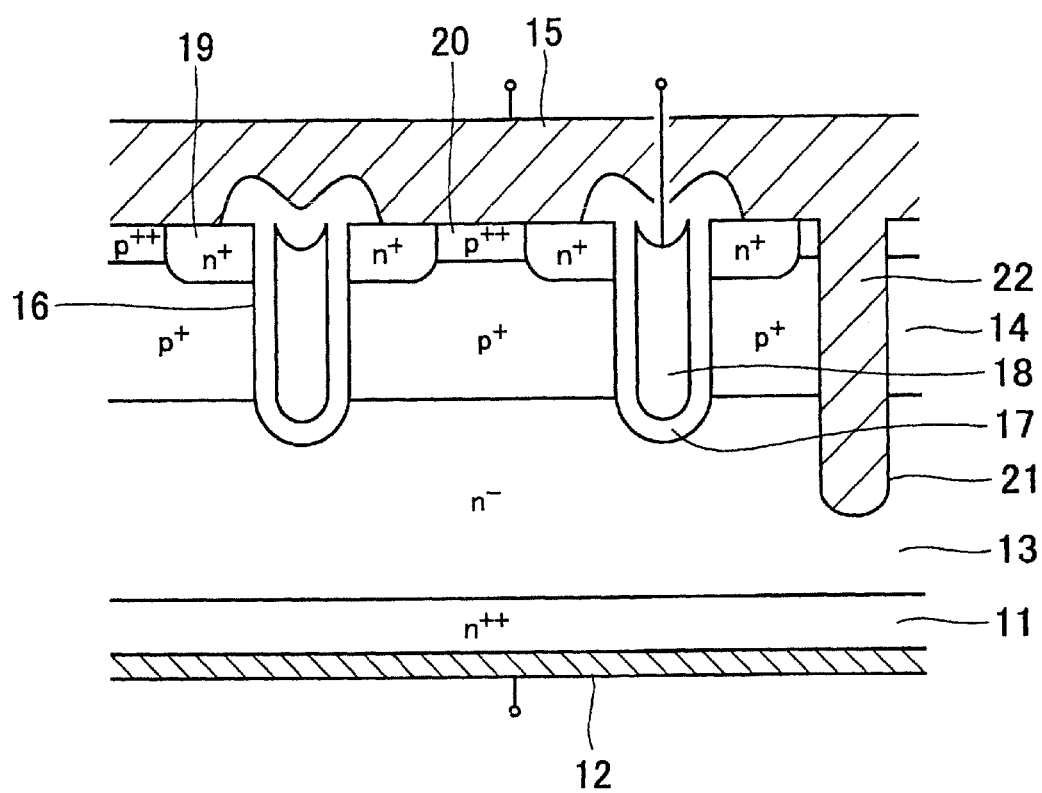
FIG. 9 is a partial cross sectional view showing an example of a structure of a switching device according to the invention.

FIG. 9 is a partial cross sectional view showing an example of a structure of a switching device according to the invention.

The switching device shown in FIG. 9 is a trench gate N-channel vertical MOSFET. The MOSFET is provided with a drain electrode 12 as a first main electrode on one principal surface of a semiconductor substrate 11. On a surface of the semiconductor 11 on the side opposite to the side with the drain electrode 12, a voltage withstanding layer 13 and a conduction layer 14 are formed in lamination to become a semiconductor base. On the other principal surface of the semiconductor base, a source electrode 15 as a second main electrode is provided. The semiconductor base has a plurality of first trenches 16 each being formed in a form of penetrating the conduction layer 14 from the other principal surface. The inner surface of the first trench 16 is coated with a gate insulator film 17 of silicon dioxide the surface of which is electrically insulated from the semiconductor base. In the first trench 16, a gate electrode 18 as a control electrode is buried. On the surface side of the conduction layer 14, a source region 19 and a contact region 20 are formed. Moreover, in the conduction layer 14, at positions adjacent to the first trench 16, a plurality of second trenches 21 deeper than the first trench 16, are provided which penetrate the conduction layer 14 from the other principal surface of the semiconductor base.

In each of the second trenches 21, a Schottky electrode 22 is buried to form a Schottky junction at the interface of the Schottky electrode 22 and the semiconductor base. When the material of the semiconductor base is SiC, for the material of the Schottky electrode 22, platinum, for example, can be preferably used.

Namely, the switching device is made to have a structure in which the second trench 21 is provided which is deeper than the first trench 16 having the gate electrode 18 buried therein on the gate insulator film 17, and the Schottky electrode 22 is buried in the second trench 21. The structure is formed so that the maximum electric field strength at the avalanche breakdown of the switching device is presented at a position away from the gate insulator film 17, by which the gate insulator film 17 is protected. Moreover, the structure is designed so that each of the semiconductor sections between a plurality of the second trenches 21 is a region pinched-off (with a channel made cut-off) at a low applied voltage by a depletion layer extending from the Schottky electrode 22. This causes most of lines of electric force produced with a voltage applied thereafter to be drawn into the Schottky electrode 22. Thus, no electric field strength in the bottom of the first trench 16 comes to significantly exceed the electric field strength at pinch-off. Therefore, the electric field strength in the gate insulator film 17 covering the inner wall surface of the first trench 16 is to be always lower than the normal maximum electric field strength of the film 17.

To protect the gate insulator film 17 means to electrically shield the gate from the drain so that the electric field strength in the gate insulator film 17 is made lower than the electric field strength due to a high voltage applied to the drain when no shield is provided. Such a method is to essentially make gate-drain capacitance decrease significantly. To decrease gate-drain capacitance is generally considered to be preferable. In a high breakdown voltage power device, however, excessively small gate-drain capacitance results in an abnormally high value of dV/dt. Nevertheless, by applying such a high breakdown voltage power device to the power conversion circuits according to the invention, the value of dV/dt can be decreased.

The subject with respect to the protection of a gate insulator film is not limited to the subject for a so-called trench MOSFET but the same is true for a planar MOSFET (also referred to as DMOSFET). Namely, when a JFET region, presented between p-wells of a DMOSFET, is designed so as to be pinched-off under an applied voltage sufficiently lower than its breakdown voltage, like in a trench MOSFET, the electric field strength in the gate insulator film can assume only an electric field strength which is lower than the normal maximum electric field strength of the gate insulator film as far as the gate insulator film is concerned.

The protection of the gate insulator film is required in the case in which the product of the dielectric breakdown electric field strength of a semiconductor and the dielectric constant of the semiconductor is essentially larger than the product of the normal maximum electric field strength of a gate insulator film and the dielectric constant of the gate insulator film. This is because, in such a case, a gate must be isolated from a high voltage on the drain side by a method of some kind, which results in inevitably small gate-drain capacitance that causes dV/dt to exhibit an abnormally high value. However, in the case of a so-called planar MOS, what becomes an issue is not a gate insulator film but an oxide film on a JFET region on which film a gate electrode is formed.

In the above example, detailed explanation of the switching device was made about a power device using a semiconductor of silicon carbide (SiC) or a semiconductor of a compound crystal (AlGaN) of gallium nitride (GaN) and aluminum nitride (AlN). For the semiconductor, however, only GaN or AlN can be additionally used. Moreover, for any power device in which gate-drain capacitance is structurally small and causes the value of dV/dt to be abnormally high, other semiconductors such as Si can be used. Furthermore, in the above example, the Schottky electrode 22 of a metallic material is buried into the second trench 21 to form a Schottky junction between the semiconductor base and the Schottky electrode 22. However, instead of the metallic material, a semiconductor material can be buried so as to form a p-n junction. Furthermore, both of a Schottky junction and a p-n junction can be made presented between the Schottky electrode 22 and the semiconductor base.

The disclosure of Japanese Patent Application No. 2009-108935 filed on Apr. 28, 2009 is incorporated as a reference.

While the invention has been explained with reference to the specific embodiments of the invention, the explanation is illustrative and the invention is limited only by the appended claims.

What is claimed is:

1. A power conversion circuit converting DC electric power of a DC power supply into AC electric power to send the AC power to an inductive load, comprising:
    a first switching device connected to a positive pole of the DC power supply to exhibit a conductive state and a current interrupting state;
    a first diode arranged parallel to the first switching device;
    a second switching device connected to a negative pole of the DC power supply to exhibit a conductive state and a current interrupting state;
    a second diode arranged parallel to the second switching device;
    a first inductor provided between an output point for the inductive load and a first connection point between the first diode and the first switching device;
    a second inductor provided between the output point for the inductive load and a second connection point between the second diode and the second switching device; and
    a clamping diode connected between the first connection point and the second connection point so that conduction is provided in one direction from the second connection point to the first connection point,
    wherein the first and second switching devices and the clamping diode are arranged such that when the first switching device is turned on, a current flows through the first switching device, the first inductor and the inductive load, and
    when the first and second switching devices are turned off, a current flows through the second diode, the clamping diode, the first inductor, the output point and the inductive load to thereby completely flow out a current in the first inductor to reduce loss of the current, and then a current flows through the second diode, the second inductor, the output point and the inductive load.

2. The power conversion circuit as claimed in claim 1, wherein the first switching device has a first capacitor connected in parallel thereto, and the second switching device has a second capacitor connected in parallel thereto.

3. The power conversion circuit as claimed in claim 2, wherein the clamping diode has a resistor connected in series thereto.

4. The power conversion circuit as claimed in claim 1, wherein each of the first and second switching devices includes a semiconductor having a band gap larger than that of a silicon base material thereof.

5. The power conversion circuit as claimed in claim 4, wherein the semiconductor is one of silicon carbide, gallium nitride, aluminum nitride and a compound crystal of gallium nitride and aluminum nitride.

6. The power conversion circuit as claimed in claim 4, wherein each of the first and second switching devices is a MOSFET.

7. The power conversion circuit as claimed in claim 6, wherein each of the first and second switching devices comprises:
a semiconductor base;
a first main electrode provided on a first principal surface of the semiconductor base;
a second main electrode provided on a second principal surface on an opposite side of the first principal surface of the semiconductor base;
a control electrode provided on the second principal surface of the semiconductor base; and
an insulator film provided between the control electrode and the semiconductor base for electrically insulating the control electrode from the semiconductor base,
wherein the semiconductor base and the insulator film are provided so that product of a dielectric breakdown electric field strength and a dielectric constant of the semiconductor base is larger than a product of a normal dielectric breakdown electric field strength and a dielectric constant of the insulator film.

8. The power conversion circuit as claimed in claim 7, wherein each of the first and second switching devices further comprises a plurality of electrodes which is separately provided at positions adjacent to the control electrode while being connected to the second main electrode and each of which forms one of a p-n junction and a Schottky junction at an interface with the semiconductor base, the plurality of electrodes causing an electric field strength to become a maximum at a section away from the insulator film at an avalanche breakdown of each of the first and second switching devices with a voltage applied between the first and second main electrodes.

9. The power conversion circuit as claimed in claim 8, wherein the plurality of separately provided electrodes, each forming one of the p-n junction and the Schottky junction at the interface with the semiconductor base, forms a depletion layer extending from the electrodes in a cross section including the insulator film in each of the first and second switching devices to make sections of the semiconductor base positioned between the plurality of electrodes pinched-off to cause the electric field strength to become the maximum at the section away from the insulator film when the voltage is applied between the first and second main electrodes.

10. The power conversion circuit as claimed in claim 7, wherein each of the first and second switching devices further comprises:
a first trench formed on the second principal surface of the semiconductor base with an inner surface thereof covered with the insulator film and the control electrode provided therein; and
a plurality of second trenches each being formed on the second principal surface of the semiconductor base with a depth greater than a depth of the first trench and provided with an electrode forming one of a p-n junction and a Schottky junction at an interface with the semiconductor base,
the electrode provided in each of the plurality of second trenches making each of sections of the semiconductor base between the plurality of second trenches as a region for being pinched-off to cause an electric field strength to become maximum at a section away from the insulator film when a voltage is applied between the first and second main electrodes.

11. The power conversion circuit as claimed in claim 1, wherein at least one of the first and second switching devices is controlled by a control circuit operated by an electrically isolated external signal supplied by a photocoupler.

12. The power conversion circuit as claimed in claim 1, wherein the clamping diode is arranged between the first and second connection points without connecting to the inductive load in a middle thereof.

* * * * *